United States Patent
Heirman et al.

(10) Patent No.: US 10,942,851 B2
(45) Date of Patent: Mar. 9, 2021

(54) SYSTEM, APPARATUS AND METHOD FOR DYNAMIC AUTOMATIC SUB-CACHELINE GRANULARITY MEMORY ACCESS CONTROL

(71) Applicant: Intel Corporation, Santa Clara, CA (US)

(72) Inventors: Wim Heirman, Ghent (BE); Stijn Eyerman, Evergem (BE); Kristof Du Bois, Aalst (BE); Ibrahim Hur, Portland, OR (US); Joshua B. Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 16/203,891

(22) Filed: Nov. 29, 2018

(65) Prior Publication Data
US 2020/0174929 A1 Jun. 4, 2020

(51) Int. Cl.
*G06F 12/08* (2016.01)
*G06F 12/0804* (2016.01)

(52) U.S. Cl.
CPC .. *G06F 12/0804* (2013.01); *G06F 2212/1021* (2013.01); *G06F 2212/154* (2013.01); *G06F 2212/608* (2013.01)

(58) Field of Classification Search
CPC ............ G06F 12/0886; G06F 11/3409; G06F 12/0811; G06F 11/3037; G06F 12/0804; G06F 2212/163; G06F 2212/608; G06F 2212/1021; G06F 2201/81; G06F 2212/1041; G06F 2212/1028; G06F 2212/502; G06F 2212/154; G06F 2201/88
See application file for complete search history.

(56) References Cited

U.S. PATENT DOCUMENTS

| | | | |
|---|---|---|---|
| 6,209,082 B1 * | 3/2001 | Col | G06F 9/3005 712/225 |
| 10,628,052 B2 * | 4/2020 | Kaburaki | G06F 12/0868 |
| 2015/0089159 A1 * | 3/2015 | Busaba | G06F 12/0817 711/144 |
| 2018/0018268 A1 * | 1/2018 | Verrilli | G06F 12/084 |

(Continued)

FOREIGN PATENT DOCUMENTS

WO WO-9811484 A1 * 3/1998 ............ G06F 9/3832

OTHER PUBLICATIONS

E. Morancho, J. M. Liaberia and A. Olive, "Looking at history to filter allocations in prediction tables," 1999 International Conference on Parallel Architectures and Compilation Techniques (Cat. No. PR00425), Newport Beach, CA, USA, 1999, pp. 314-319.*

(Continued)

*Primary Examiner* — Pierre Miche Bataille
(74) *Attorney, Agent, or Firm* — Trop, Pruner & Hu, P.C.

(57) ABSTRACT

In one embodiment, an apparatus includes a memory access circuit to receive memory access instructions and provide at least some of the memory access instructions to a memory subsystem for execution. The memory access circuit may have a conversion circuit to convert the first memory access instruction to a first subline memory access instruction, e.g., based at least in part on an access history for a first memory access instruction. Other embodiments are described and claimed.

16 Claims, 15 Drawing Sheets

(56) References Cited

U.S. PATENT DOCUMENTS

2018/0285252 A1    10/2018    Kwon

OTHER PUBLICATIONS

K. J. Nesbit and J. E. Smith, "Data cache prefetching using a global history buffer," in IEEE Micro, vol. 25, No. 1, pp. 90-97, Jan.-Feb. 2005.*

G. Hariprakash, R. Achutharaman and A. R. Omondi, "DStride: data-cache miss-address-based stride prefetching scheme for multimedia processors," Proceedings 6th Australasian Computer Systems Architecture Conference. ACSAC 2001, Gold Coast, Queensland, Australia, 2001, pp. 62-70.*

Levitan, DS and Song, SP, "Efficient Use of Branch History Table in Architectures that Use Counter and Condition Register-Based Branch Instructions", IBM Technical Disclosure Bulletin (TDB v37 n6A 06-94 p. 33-34), Jun. 1, 1994.*

U.S. Appl. No. 15/996,184, filed Jun. 1, 2018, entitled "Indirect Memory Fetcher," by Stijn Eyerman.

U.S. Appl. No. 16/024,527, filed Jun. 29, 2018, entitled "Apparatus, Method, and System for Enhanced Data Prefetching Based on Non-Uniform Memory Access (NUMA) Characteristics," by Wim Heirman.

U.S. Appl. No. 15/940,712, filed Mar. 29, 2018, entitled "Storing Cache Lines in Dedicated Cache of an Idle Core," by Wim Heirman.

* cited by examiner

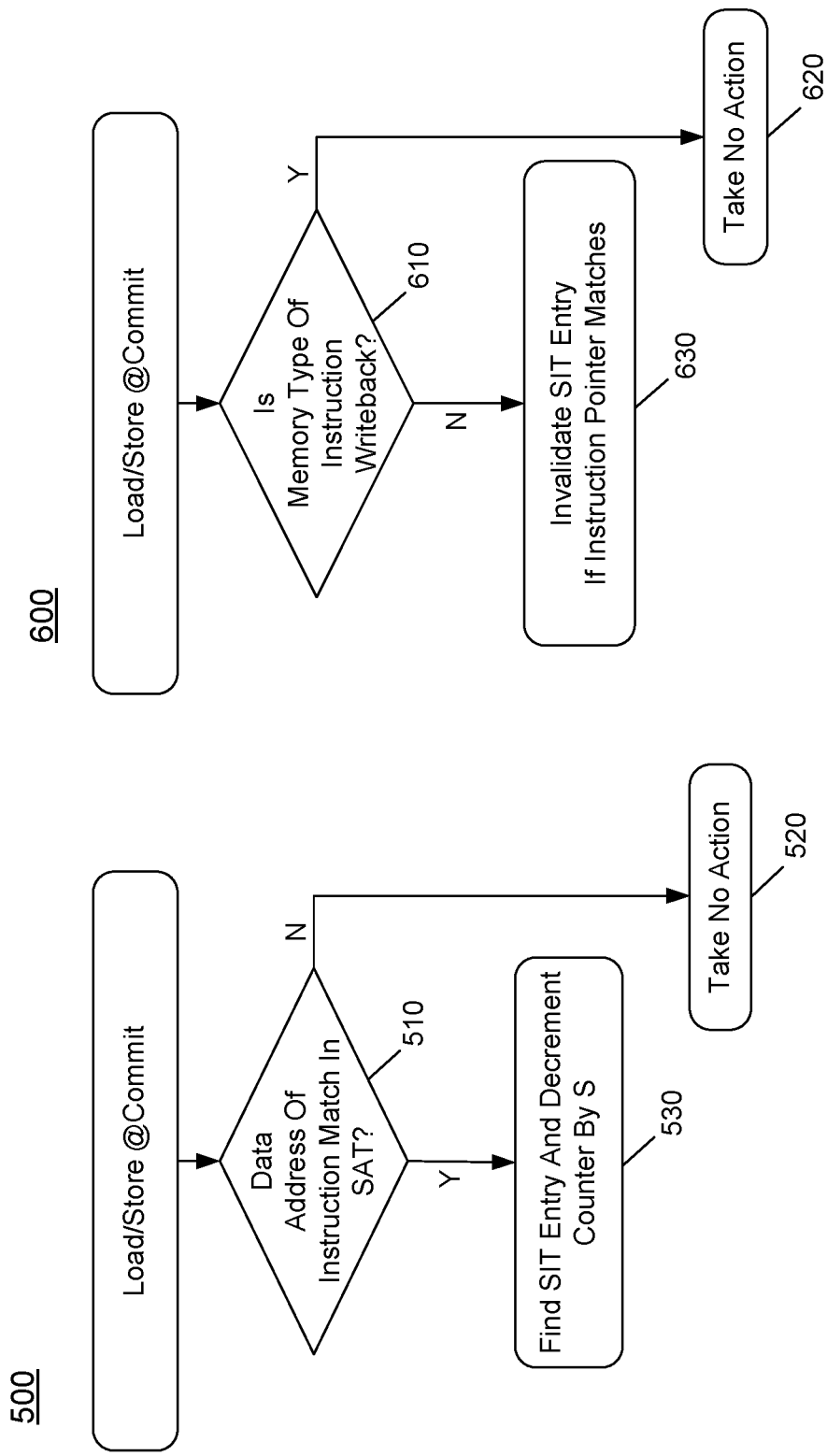

SYSTEM, APPARATUS AND METHOD FOR DYNAMIC AUTOMATIC SUB-CACHELINE GRANULARITY MEMORY ACCESS CONTROL

TECHNICAL FIELD

Embodiments relate to memory access operations between a memory and a processor.

BACKGROUND

Many applications such as database systems and sparse machine learning algorithms work on large data sets but exhibit poor spatial locality. As a result, such applications do not match well with conventional cache and memory systems that are optimized for linear access streams of at least one cacheline (e.g., 64 bytes) length. Some processor architectures that are aimed at accelerating graph workloads add support for uncached, small-granularity memory accesses, which reduce the bandwidth wastage resulting from cacheline-granularity accesses, at some cost in total bandwidth. However, programmer intervention and recompilation are required to determine which load or store instructions to convert into uncached small-granularity (sub-cacheline) accesses. Systems that support sub-cacheline accesses require either the use of special load and store instructions, or the definition of a range of memory addresses that are always accessed at sub-cacheline granularity. But unmodified applications cannot take advantage of smaller accesses.

BRIEF DESCRIPTION OF THE DRAWINGS

FIG. 5 is a flow diagram of a method in accordance with another embodiment of the present invention.

FIG. 6 is a flow diagram of a method in accordance with a still further embodiment of the present invention.

DETAILED DESCRIPTION

Figure 1:
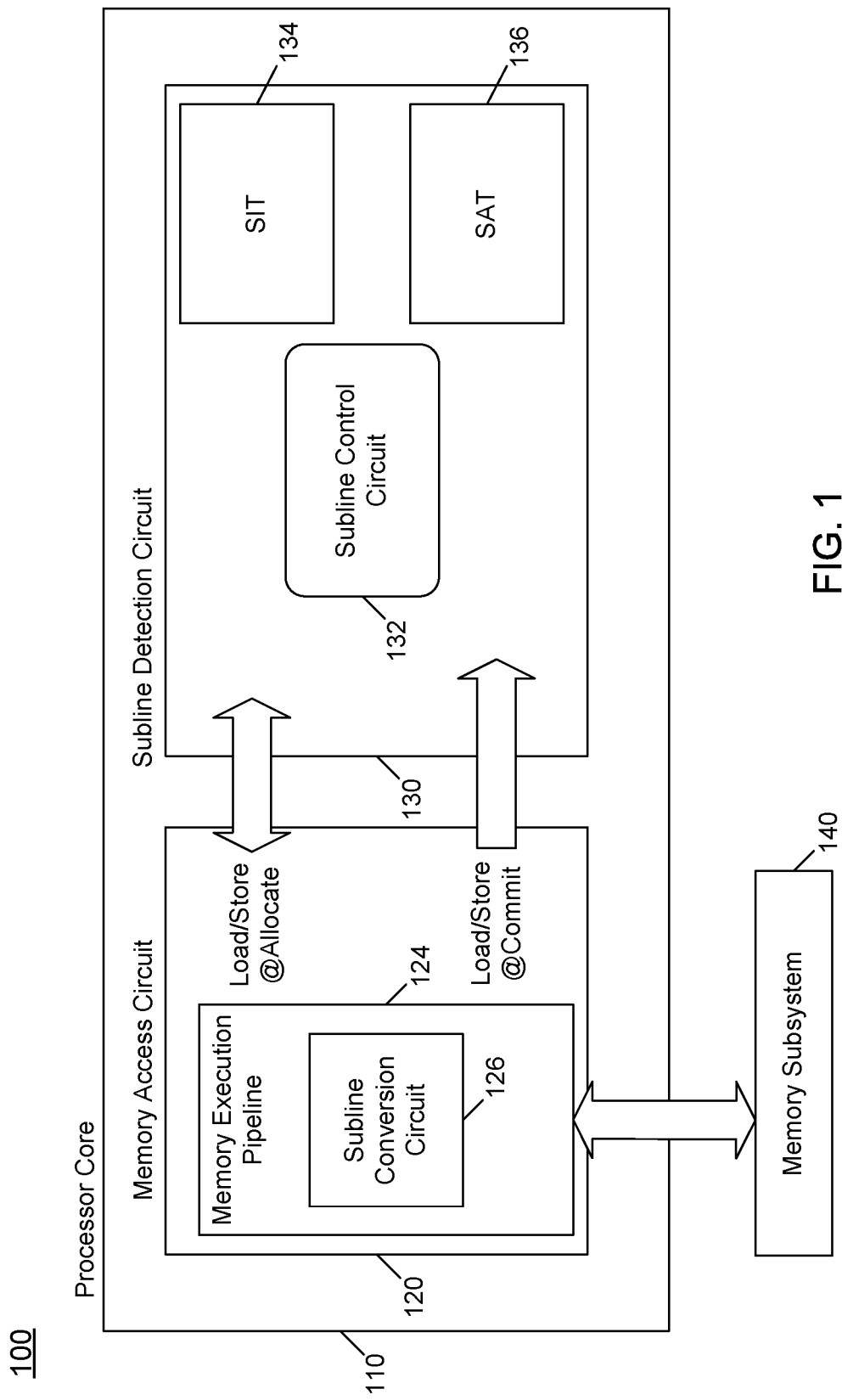
FIG. 1 is a block diagram of a portion of a processor in accordance with an embodiment of the present invention.

In various embodiments, a processor may include one or more hardware structures that measure behavior of memory access instructions including load and store instructions. Based on this behavior measurement information, at runtime, the processor may further be configured to identify which of these memory access instructions would likely benefit from using sub-cacheline-based memory accesses (herein referred to as subline accesses or subline memory accesses). Identification of such instructions may then be communicated to memory access circuitry of the processor (e.g., a load-store unit). In response to receipt of this information, the memory access circuitry may be configured to automatically perform subline, rather than full cacheline width, accesses when these instructions are executed again later. In this way, unmodified applications can execute using both regular cached memory accesses and uncached subline accesses, where appropriate.

As will be described herein, hardware structures of the processor may be used to measure the behavior of memory access instructions, and identify those that will likely benefit from using subline accesses. As examples, the hardware may detect load operations that have poor spatial and temporal locality, and hence allocating them in cache memory is not useful, while doing cacheline-granularity memory accesses wastes bandwidth. Additional processor hardware may be used to automatically convert such operations that are deemed beneficial for conversion to subline accesses, potentially for a remainder of the execution of that application. Note that instructions are not converted instructions in program memory, this also means the conversion is not visible to other processors (on a shared memory system where the application instructions live in shared memory). Instead the conversion is done for an instruction dynamically and on the conditions described herein within a given processor core, each time it executes.

In a typical processor with a multi-level cache hierarchy, cache misses lead to memory accesses at cacheline granularity (e.g., at 64 bytes (B)). Many available commodity memory subsystems are organized around this 64B access granularity. To support applications with large data sets and poor spatial locality, specialized architectures exist that allow for smaller sized accesses, e.g., 8 bytes. These 8-byte accesses are less expensive (in terms of energy, performance, etc.) than one 64-byte access, and thus they allow for savings when only 8B of data are needed. However performing eight separate 8B accesses is often more expensive than a single 64B access. As such, accesses that benefit from spatial locality may be maintained as conventional 64B accesses. Rather than requiring a programmer to choose to either perform a cached access using a normal load/store instruction, or an 8B uncached access by using a specialized load or store instruction, embodiments may, automatically and dynamically, identify load and store instructions that exhibit poor spatial and temporal locality. Such instructions result in data accessed by this instruction that is not accessed again soon after, either by that same instruction or any other instruction; and that the same property holds for all other bytes that occupy the same cacheline.

In an embodiment, the following conditions may be used to identify instructions that are to be converted to use sub-cache line width accesses. One condition includes access granularity of the instruction (e.g., 8 bytes or less, which may exclude typical vector loads and stores). Another condition is that the addresses referenced by the instruction are at least mostly not cache resident. In general, a given load/store instruction that often initiates a memory access would be a good first indication of suitability for subline access.

However there are two cases that may be excluded from the above baseline assumptions. As a first case, it is noted that initial accesses to a data structure (cold misses) cause a burst of memory accesses. As a second case, certain instructions can bring data into a cache hierarchy that is later used by another instruction. Not installing that data into the cache hierarchy would change the later instruction from a cache hit into a cache miss, reducing performance and increasing total memory bandwidth pressure. As such, cold cases and load instructions that bring in data later accessed by another instruction may be identified using embodiments, so that they are not converted to subline accesses.

Referring now to FIG. 1, shown is a block diagram of a portion of a processor in accordance with an embodiment of the present invention. More specifically, the portion of processor 100 shown in FIG. 1 includes hardware circuitry adapted to perform subline access determinations and conversions of cacheline-based memory accesses into subline-based memory accesses as described herein. Processor 100, which may be a single core processor, multicore processor or other system on chip (SoC), includes a core 110 that can be, in different embodiments, an in-order core or an out-of-order core.

In the high level shown in FIG. 1, core 110 includes a memory access circuit 120 and a subline detection circuit 130 that couple together to perform detection of memory access instructions that may be appropriate for subline handling and to convert such identified memory access instructions into subline memory access instructions. In turn, core 110 couples to a memory subsystem 140, which is processor circuitry that acts as an interface to a main memory, such as a system memory formed of dynamic random access memory (DRAM). In embodiments herein, memory subsystem 140 may include one or more levels of a cache hierarchy, as well as an integrated memory controller, among other circuitry to interface processor 100 with a system memory (not shown for ease of illustration in FIG. 1).

Still with reference to FIG. 1 memory access circuit 120 includes a memory execution pipeline 124 that is configured to receive incoming memory access instructions and handle such instructions to enable store and load operations to be performed with system memory, via memory subsystem 140. As illustrated in FIG. 1, memory execution pipeline 124 includes a subline conversion circuit 126. As will be described herein, subline conversion circuit 126 may be configured, upon identification of a memory access instruction appropriate for subline handling, to convert such instruction into one or more subline memory access instructions.

Still referring to FIG. 1, subline detection circuit 130 includes a subline control circuit 132 and associated tables, namely a subline instruction table (SIT) 134 and a subline address table (SAT) 136. In an embodiment, SIT 134 is implemented a set-associative structure, indexed by an instruction pointer of load and store instructions. Each entry of SIT 134 may include fields to store an instruction pointer, a counter value for a saturating counter, and optionally some bits for managing replacement policy and/or other metadata. In an embodiment, SAT 136 is a first-in first-out (FIFO) structure that may include fields to store a data address (with cacheline granularity) and an index that points to one of the entries in SIT 134.

As will be described herein, subline detection circuit 132 may at commit time of a memory access instruction and based on information associated with the memory access instruction, update one or more of SIT 134 and SAT 136. Then, based upon the relevant information stored in these tables, memory access circuit 120, and more specifically subline conversion circuit 126 may, prior to execution of incoming memory access instructions to be allocated in memory access circuit 120, convert appropriate ones of these instructions to subline memory access instructions, as described herein. Understand while shown at this high level in the embodiment of FIG. 1, many variations and alternatives are possible.

Figure 2:
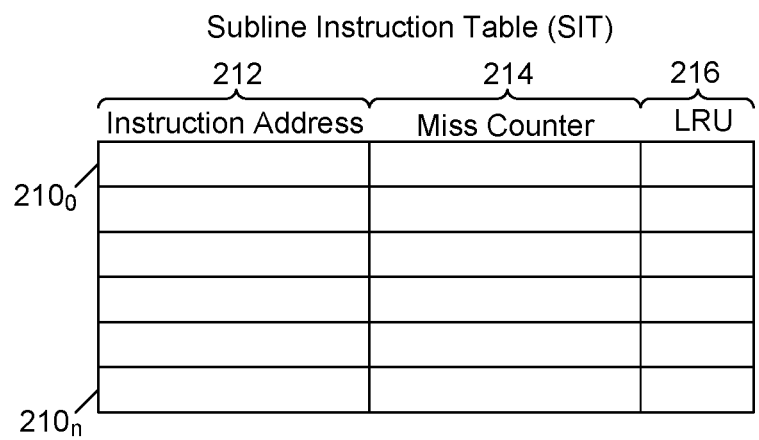
FIG. 2 is a block diagram of a subline instruction table in accordance with an embodiment of the present invention.

Referring now to FIG. 2, shown is a block diagram of a subline instruction table in accordance with an embodiment of the present invention. As shown in FIG. 2, SIT 200 includes a plurality of entries $210_0$-$210_n$. As illustrated, each entry includes fields to store various information. More specifically as shown in FIG. 2, each entry 210 includes an address field 212 to store an instruction address of a corresponding memory access instruction, a counter field 214 to store count information (which may be count information associated with misses in a cache memory hierarchy for the corresponding instruction), and a metadata field 216 to store metadata associated with the given memory access instructions. In one particular embodiment, metadata field 216 may store, inter alia, recency information associated with the entry such as so-called least recently used (LRU) information. Of course in embodiments, additional or different metadata may be stored in metadata field 216. Understand while shown at this high level in the embodiment of FIG. 2, many variations and alternatives are possible for a SIT in accordance with an embodiment.

Figure 3:
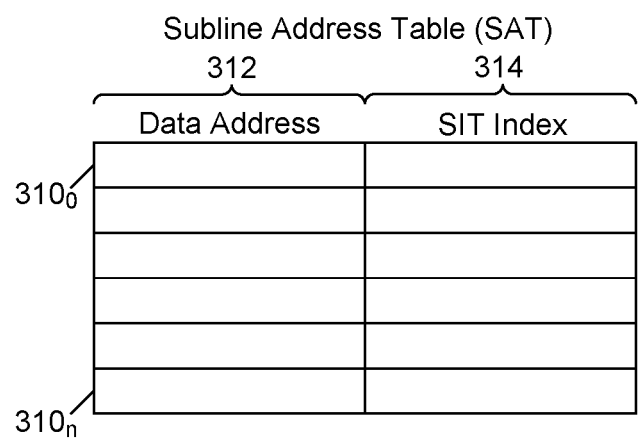
FIG. 3 is a block diagram of a subline address table in accordance with an embodiment of the present invention

Next referring to FIG. 3, shown is a block diagram of a subline address table in accordance with an embodiment of the present invention. As shown in FIG. 3, SAT 300 includes a plurality of entries $310_0$-$310_n$. As illustrated, each entry includes fields to store various information. More specifically as shown in FIG. 3, each entry 310 includes an address field 312 to store a data address of a corresponding memory access instruction and a SIT index field 214 to store an index in the SIT of a corresponding entry of the SIT. Understand while shown at this high level in the embodiment of FIG. 3, many variations and alternatives are possible for a SIT in accordance with an embodiment.

When memory access circuit 120 commits a load or store instruction, information pertaining this load/store is sent to subline detection circuit 130. In an embodiment, this information includes the instruction pointer virtual address, the data virtual address (at cacheline granularity), access size, memory type (e.g., writeback (WB), uncacheable (UC), etc.)

and a bit indicating whether the data was found in an on-chip cache (value of 1) or was loaded from off-chip DRAM, e.g., a value of (value of 0). Subline control circuit 132 may update the state of one or more of SIT 134 and SAT 136, based on this information as described herein.

First, for those instructions that access memory at a granularity smaller than cacheline size, the instruction pointer is looked up in SIT 134. If there is no match, and the instruction caused a cache miss, an entry is selected for replacement using a given replacement policy (e.g., LRU, round-robin, random, etc.). Selection may also be biased towards entries with a low counter value. A newly allocated entry is initialized by filling in its instruction pointer, and resetting the counter value to zero. When there is a match in SIT 134, the saturating counter value of the entry is updated: if the memory access hit in cache this counter value is decremented by a first predetermined value H (until zero), else it is incremented by a second predetermined value M (until a maximum value of C). In addition, if the counter value is above a first threshold (T1), the data address (at cacheline granularity) is pushed onto SAT 136 together with a pointer value that uniquely defines this instruction's SIT entry, while the oldest entry is evicted from SAT 136.

In addition, for all memory access instructions at commit time, the data address is compared to all entries in SAT 136. If there is a match, the SIT index of the matching SAT entry is used to look up the entry in SIT 134, and its counter value is reduced by a third predetermined value S.

Finally, it is noted that in an embodiment subline conversion may only occur for memory accesses to regular writeback (WB) memory spaces. Any accesses to other memory types (e.g., UC) may cause an invalidation to a corresponding SIT entry, if there is one.

Figure 4:
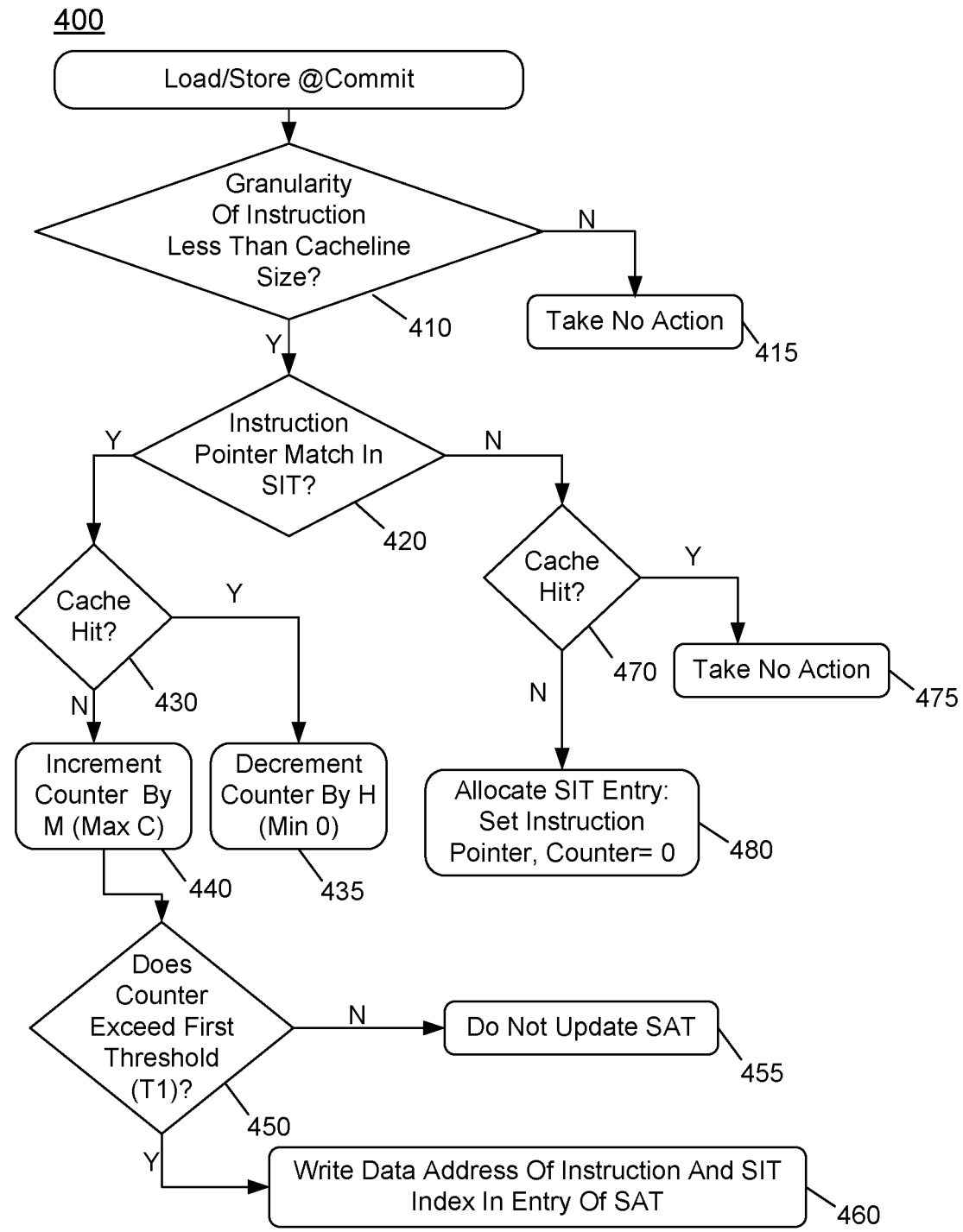
FIG. 4 is a flow diagram of a method in accordance with one embodiment of the present invention.

Referring now to FIG. 4, shown is a flow diagram of a method in accordance with one embodiment of the present invention. More specifically, method 400 shown in FIG. 4 is a method for updating information in one or more of a SIT and SAT based on information associated with a load or store instruction at commitment. Method 400 shown in FIG. 4 may be performed by hardware circuitry, firmware, software and/or combinations thereof. In a particular embodiment, method 400 may be performed by subline control circuit 132 of FIG. 1.

As illustrated, method 400 begins at commitment of a load or store instruction, where it is determined at diamond 410 whether a granularity of the instruction is less than a cacheline size. If not, control passes to block 415 where no action is taken with regard to this instruction and thus no update occurs to either the SIT or the SAT for this instruction.

Instead if it is determined that the granularity of the instruction is of a smaller granularity than cacheline size, control passes to diamond 420 to determine whether there is a match for the instruction pointer of the instruction in the SIT. If so, control passes to diamond 430 to determine whether the instruction resulted in a cache hit in at least one cache memory of the processor. If so, control passes to block 435 where a counter for the corresponding entry in the SIT for the instruction may be decremented. More specifically, this counter value may be decremented by a predetermined value H (until the counter value reaches a minimum value of zero). Note that this counter value is controlled to be no lower than zero. For a cache hit situation, this count value update is the only update to the SIT, and no SAT update occurs.

Still with reference to FIG. 4, instead in the situation where there is not a cache hit for a given instruction that has an associated entry in the SIT, control passes to block 440 where the count value associated with the entry is incremented by a predetermined value M. Note that the counter value is controlled to saturate at a maximum value of C. Next control passes to diamond 450 to determine whether the value of the counter exceeds a first threshold (T1). If so, control passes to block 460 where information associated with this instruction may be written into an entry in the SAT. More particularly in an embodiment in which a FIFO is used for the SAT, this entry is written into the top entry of the SAT (and an oldest entry of the SAT is evicted). As illustrated, the information included in the entry may include a data address (e.g., a virtual address at cacheline granularity of the instruction), and an index of the corresponding entry for this instruction within the SIT. Instead if it is determined that the counter value does not exceed the first threshold, control passes to block 455 where no update of the SAT occurs (and similarly no SIT update occurs).

Still with reference to FIG. 4, instead if at diamond 420 it is determined that there is not a matching entry within the SIT for the instruction pointer, control passes to diamond 470 to determine whether a cache hit occurred. If so, at block 475 no action is taken and thus no update to information in either the SIT or the SAT occurs. Instead, in the situation where there is a cache miss, an entry within the SIT may be allocated for this instruction with the instruction address field set to the value of the instruction pointer (block 480). In addition, the counter value for this entry may be reset to a base value of zero. Understand while shown at this high level in the embodiment of FIG. 4, many variations and alternatives are possible.

Referring now to FIG. 5, shown is a flow diagram of a method in accordance with another embodiment of the present invention. More specifically, method 500 shown in FIG. 5 is a method for updating information in a SIT based on presence of an entry in a SAT for a data address associated with a load or store instruction at commitment. Method 500 shown in FIG. 5 may be performed by hardware circuitry, firmware, software and/or combinations thereof. In a particular embodiment, method 500 may be performed by subline control circuit 132 of FIG. 1.

As illustrated, method 500 begins by determining whether a data address for the load or store instruction at commitment matches an entry in the SAT (diamond 510). If not, no further action is taken (block 520). Instead on a match, control passes to block 530 where a counter value of the corresponding SIT entry for this instruction may be decremented by another predetermined value, S (until the counter value reaches a minimum value of zero). This decrementing thus seeks to maintain the count value below relevant thresholds so as to not cause a subline conversion of a different instruction that brings in data used by this instruction at commitment. Understand while shown at this high level in the embodiment of FIG. 5, many variations and alternatives are possible.

Referring now to FIG. 6, shown is a flow diagram of a method in accordance with a further embodiment of the present invention. More specifically, method 600 shown in FIG. 6 is a method for invalidating SIT entries for particular types of load or store instructions at commitment. Method 600 shown in FIG. 6 may be performed by hardware circuitry, firmware, software and/or combinations thereof. In a particular embodiment, method 600 may be performed by subline control circuit 132 of FIG. 1.

As illustrated, method 600 begins by determining whether a memory type of the load or store instruction at commitment is a write back type (diamond 610). If not (such as where the instruction is a configuration write or an uncacheable write), control passes to block 630 where a SIT entry (if present) for the corresponding instruction pointer of this instruction is invalidated, and optionally a SAT entry is also invalidated if present. Otherwise, in the situation where the memory type of the load or store instruction at commitment is write back, no further action is taken (block 620). Understand while shown at this high level in the embodiment of FIG. 6, many variations and alternatives are possible.

Conversion of loads and stores to subline accesses occur in memory execution pipeline 124 of memory access circuit 120 of FIG. 1, when new loads and stores are allocated into the memory access circuit 120 before execution. At this time, the instruction pointer of the memory access instruction is looked up in SIT 134. If there is a match, metadata of the entry such as the replacement policy bits (if any) are updated. If the counter value is larger than a second threshold (T2), the memory access is made using a subline access rather than a regular cached access. Thus a conversion of the memory access instruction from a cacheable memory access instruction to a subline memory access instruction occurs. Note that whether subline-converted or not, the instruction's access size does not change (e.g., it is always 8B). When the instruction causes a cache miss, the cache level initiates a 64B memory access, but the cache returns only the data of interest (e.g., 8B from some offset inside the cacheline) to the core.

Figure 7:
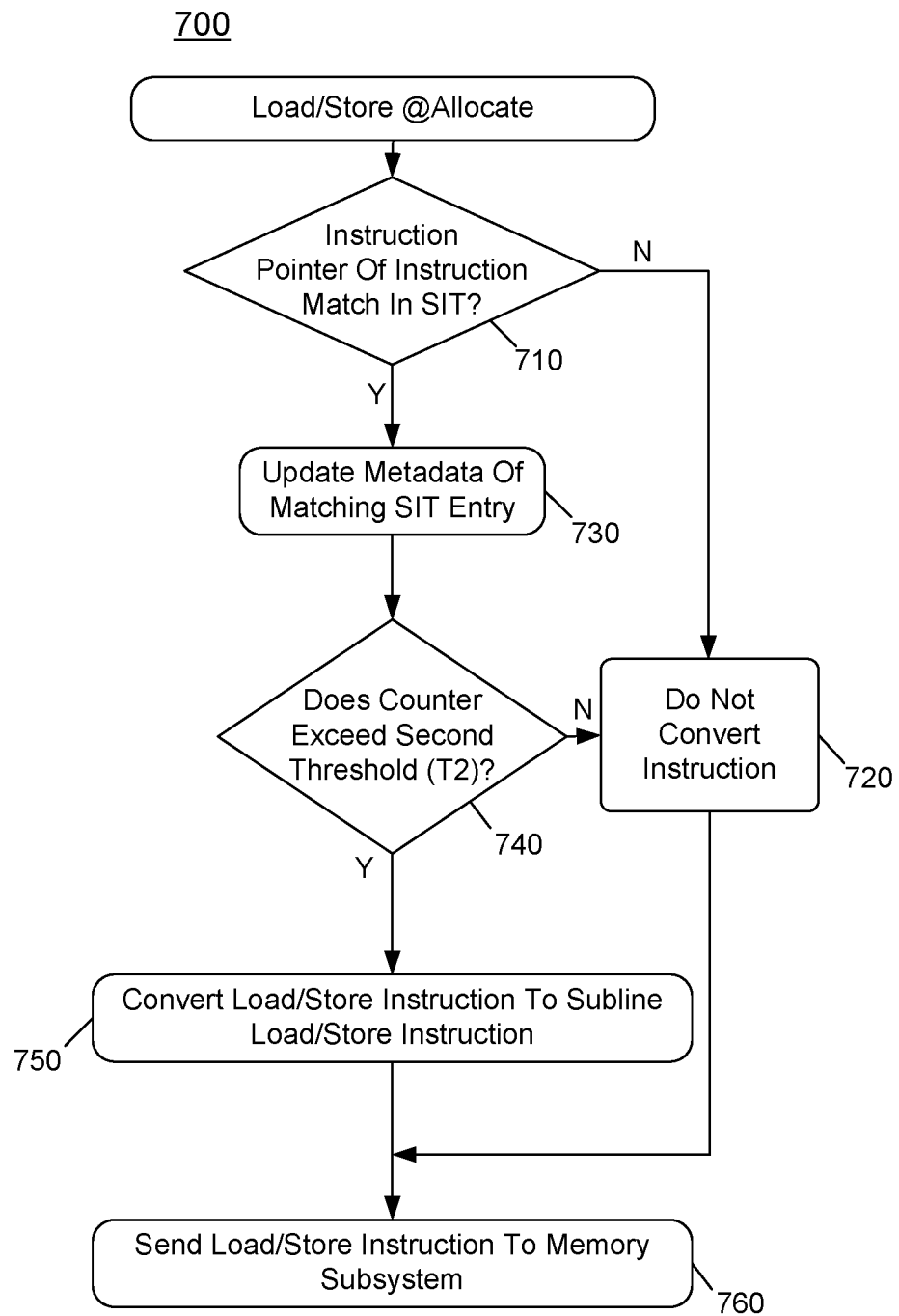
FIG. 7 is a flow diagram of a method in accordance with yet another embodiment of the present invention.

Referring now to FIG. 7, shown is a flow diagram of a method in accordance with yet another embodiment of the present invention. More specifically, method 700 is a method for determining whether to convert an incoming memory access instruction into a subline memory access instruction in accordance with an embodiment. As such, method 700 may be performed by hardware circuitry, firmware, software and/or combinations thereof. In a particular embodiment, method 700 may be performed by subline conversion circuit 126, described above in FIG. 1.

As illustrated, method 700 begins at an allocation of a given cacheable memory access instruction. More specifically at diamond 710 it is determined whether an instruction pointer matches within the SIT (diamond 710). If not, no conversion occurs (block 720) and the load/store instruction proceeds through the memory execution pipeline and onto the memory subsystem as a cacheable memory access instruction.

Still with reference to FIG. 7, instead if it is determined that there is a match in the SIT for the memory access instruction, control passes to block 730 where metadata for the entry may be updated. More specifically, replacement information such as LRU position may be updated for this entry. Next control passes to diamond 740 to determine whether a value of the counter for this entry exceeds a second threshold, namely a T2 threshold, which may be set at a higher value than the first threshold. If so, control passes to block 750 where the memory access is converted to a subline access. As such, the load/store instruction may be converted to a subline load/store instruction. In an embodiment, the original load/store instruction is a cacheable instruction, e.g., for writeback data. Any types of conventional user-level load or store instructions to access less than an entire cacheline width of data with a cacheable property may correspond to this load/store instruction. In turn in an embodiment, the converted load/store instruction may be a user-level instruction or optionally another instruction type that is uncached and has a data width less than cacheline width. In a representative embodiment herein, this data width may be 8B, however wider or narrower data widths are possible in other embodiments. After conversion, this converted subline memory access instruction is passed on through the memory execution pipeline and onto the memory subsystem for execution (block 760). Otherwise if the counter value does not exceed this second threshold, no conversion occurs (block 720), and the unconverted memory access instruction is sent to the memory subsystem (block 760). Understand while shown at this high level in the embodiment of FIG. 7, many variations and alternatives are possible.

Using embodiments described herein, a load or store may be converted to a subline accesses after a given number of (e.g., T2/M) consecutive cache misses. Using the variables described above for updating count information for instructions, in a particular embodiment T2/M consecutive misses may occur before identifying an access instruction for subline conversion. In an embodiment, M may be set to 1, and thus C can be dimensioned such that it is larger than the number of expected initial cache misses that a cache-resident structure would see. Such sizing prevents an initial burst of cold misses from resulting in subline conversion, after which the structure would no longer allocate in the cache. In this situation there would not be further cache hits that would decrement the counter and undo the subline conversion (unless a given SIT entry is replaced, or is cleared by a SAT match). For a typical per-core last level cache (LLC) capacity of a few megabytes (MB), a value of C=32.768 may be a reasonable choice: after this many cache misses, this particular instruction has touched 4 MB of data so it is unlikely to become cache resident later on.

The ratio of counter control values H/M allows some selectable fraction of cache hits to be tolerated. Even large data structures that are accessed in random fashion tend to have some cache hits on a purely probabilistic basis. With a value of H=M=1, the counter value will converge towards C only when the hit rate is below 50%. Other combinations of H/M can be used to tolerate different hit ratios in other example embodiments.

In an embodiment, the size of the SIT may be configured such that it can contain all loads and stores in a hot code path of an application. In many embodiments, typically a few thousand entries can suffice. For high performance computing (HPC) applications that often have a small code footprint, just 100 entries can often be enough. In an embodiment, the SIT may be a set-associative cache, so the number of entries in which to search for a match is limited to the associativity factor (often just 4 or 8). By biasing the replacement policy towards entries with a low counter value, those entries that are actively causing subline conversions (or are more likely to do so in the near future) are maintained over those entries that describe loads and stores with good locality, for which no further information is needed.

In embodiments, subline conversion may occur for those memory accesses that have a SIT entry with a counter value larger than T2. In many cases, T2 may be designed to be near C, but could be made slightly smaller (e.g., 90% of C) to tolerate a number of cache hits without immediately disabling the subline conversion.

Potential reuse across instructions is detected by information in the SAT. This is the case, as all data addresses for potentially subline-converted accesses are written into the SAT. If another instruction accesses a matching data address stored in the SAT (at cacheline granularity, to detect both temporal and spatial reuse), the counter of the corresponding entry in the SIT is decremented by S. Such operation potentially reduces the counter value below the T2 threshold, disabling subline conversion for the instruction that originally loaded this address. The ratio of S/M determines how many SAT hits are allowable for an instruction to still be marked as subline appropriate. Many workloads with random access patterns often see small amounts of reuse. Converting instructions for such workloads to uncached/ subline operations prevents the ability to exploit this reuse, but this cost is often more than offset by reducing the bandwidth pressure of the common case where no reuse is present. Setting S to a small value may help these cases so that some reuse is tolerated, while a large value of S would disable subline conversion for an instruction as soon as any reuse is detected.

Typically cross-instruction reuse happens quickly (e.g., spatial reuse when loop unrolling) so the SAT can be relatively small, e.g., 8 or 16 entries, which makes it cheap to check the SAT for a match. In another embodiment, a larger SAT can be implemented by splitting it into sets indexed by some number of data address bits, and having a FIFO structure per set, at a small cost in tracking accuracy (while enabling much larger tracking coverage). The first threshold (T1) determines when to begin using the SAT (by adding a new entry to it) to detect cross-instruction locality. In an embodiment, this first threshold may be set at a value slightly below T2 (e.g., 90% of T2). Such a value enables address tracking for all subline-converted accesses (as those have a counter value >T2), but also those accesses that may become subline in the near future. In this way, cross-instruction locality can be detected even before an instruction is (wrongly) converted.

In an embodiment, the configuration parameters described above (H, M, C, S, T1, T2) can be either fixed at design time, or set through configuration registers by firmware such as basic input/output system (BIOS), system software, or even application software in response to (optional) online or offline performance tuning.

Additional parameters regarding subline detection and conversion can be present in some embodiments. For example, in some cases the capacity to perform subline conversions may be based on memory bandwidth. For example, when memory traffic is at a relatively low level, the conversion mechanism may be disabled and instead is enabled when the memory traffic exceeds a given traffic threshold.

For simplicity, automatic conversion may be configured to only apply to loads and stores to cached writeback memory ranges (WB). Accesses to other regions (e.g., uncached (UC) or I/O ranges) are less common and usually not performance critical, and thus may be controlled to remain unmodified. Since the memory type depends on the address, it is only known at commit. Loads/stores that commit and accessed a memory type other than WB do not allocate into the SIT, and invalidate their SIT entry if they have one. Usually, the memory type accessed is constant for each instruction, e.g., an instruction that at some point accessed WB memory and was converted to a subline access will unlikely access UC memory at some later point. If this does happen, a subline-converted instruction accessing non-WB memory can be removed from a pipeline (i.e., nuked) at the execute stage (after address generation and memory type is known), its SIT entry invalidated, and execution restarts at this instruction now without converting it to a subline access.

In embodiments, subline reads act as regular reads with respect to coherency: they check their own private caches, send back-snoops, use data from an on-chip copy when available, potentially cause coherency state downgrades in other caches (e.g., modified to shared), and set their core-valid bit in the tag directory. If the cacheline is available in its own private cache or in another on-chip cache, the cacheline is not invalidated. Only when the cacheline is not available on the chip, the data is not cached and the read is a truly uncached subline DRAM access. This makes sure that cachelines that are loaded by normal, non-subline loads are not invalidated, and thus there is no performance hit.

If the cacheline is not in the requester's private cache, but it is available in a cache of another core, the cacheline is not loaded in the requester's private cache. However, the core-valid bit is set in the tag directory, indicating that the core has used data from this cacheline (to ensure proper memory ordering, as described below). The only exception on a normal coherence protocol is that the core performing a subline load is not set as the forwarder: because this core does not have a full copy of the cacheline, it cannot provide data to other cores. If the core that did the subline load is the only remaining valid core for a cacheline, later accesses by other cores to this line always fetch from memory (using a normal or subline access, depending on the type of the new load).

Note that subline memory operations do not result in incomplete cachelines (i.e., cachelines where only part of the cacheline is valid). If the full cacheline is available on-chip, its value is used; if not, the partial data is not cached at all.

Subline stores are handled similar to write combining stores. This means they trigger back-invalidations into any cache that has a copy of the line. If a modified copy is available anywhere, its content is combined with the subline value being written and the result is written to DRAM, using a regular write rather than a subline write as now new data is available for the full cacheline. The cacheline is not kept in any core's private cache afterwards. The cacheline may optionally be kept in a shared last-level cache. This situation does not cause a performance hit for the cores that originally held the cacheline, as a write to a cacheline in a core always causes the invalidation of the copies in other cores.

During execution inside the core, subline-converted loads and stores remain ordered as if they still were regular loads and stores. Because subline loads set their core-valid bit in the tag directory, the core executing a subline load will receive invalidation messages when other cores write to this line, which can be checked against the memory order queue (e.g., restarting execution from a not yet committed load for which the data on its load address has been invalidated).

With embodiments, automatic conversion of memory accesses to uncached subline loads and stores can yield performance benefit for many workload types, while avoiding degradation (and sometimes even yielding additional benefits) on other workloads, all without programmer intervention or even recompilation. In contrast, without an embodiment, programmer intervention and recompilation would be required to use subline accesses. Identifying which instructions or data structures benefit from subline accesses is no easy task as explained above, even for an experienced programmer, and thus embodiments provide a technological advancement by providing hardware-based automated runtime mechanisms to detect memory access instructions appropriate for subline handling, rather than requiring a programmer to do so. With automatic identification, embodiments can apply to unmodified applications, improving operating efficiency, reducing memory traffic and power consumption.

As such, embodiments allow unmodified applications to take advantage of processor memory subsystem features that enable uncached word-granularity DRAM accesses, saving memory bandwidth and energy. On bandwidth-bound scenarios (which is usually the case for large-footprint applications), this reduction in effective bandwidth utilization automatically increases performance. It can also reduce cache pollution by not allocating non-temporal data in cache, which can cause additional performance increase even in non-bandwidth-bound scenarios.

Figure 8:
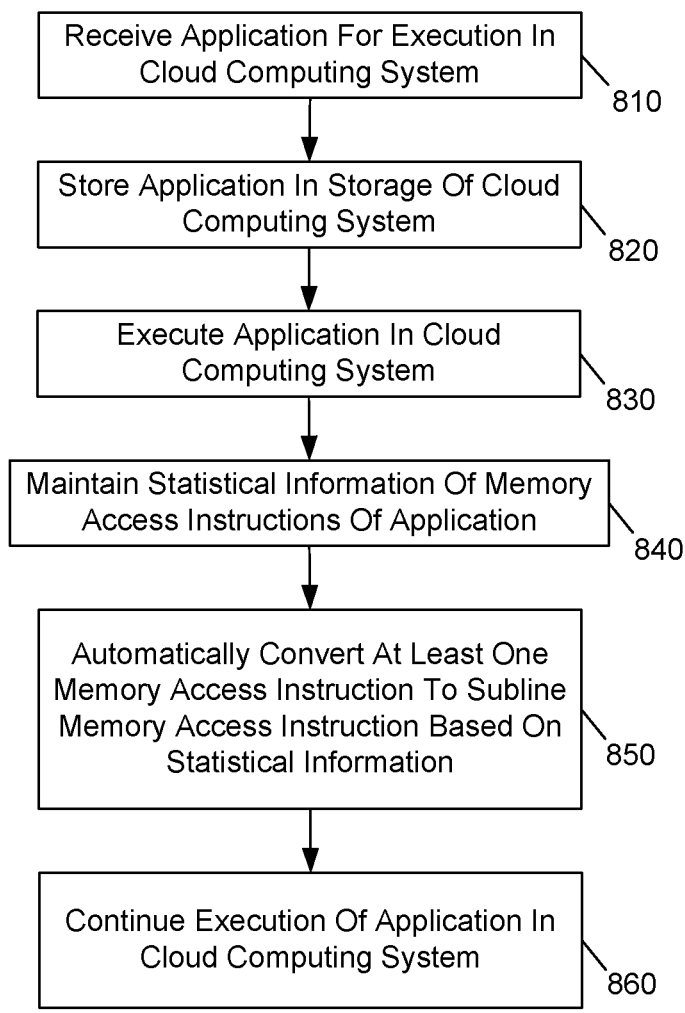
FIG. 8 is a flow diagram of a method in accordance with yet another embodiment of the present invention.

Referring now to FIG. 8, shown is a flow diagram of a method in accordance with yet another embodiment of the present invention. As shown in FIG. 8, method 800 is a method for executing applications within a computing system. More particularly method 800 of FIG. 8 is a method for executing applications in a cloud computing system, such as one or more server computers of a datacenter, which may be configured to execute tenant-based applications resident in a cloud storage of the datacenter. As such, method 800 may be performed by hardware circuitry, firmware, software and/or combinations thereof. In a particular embodiment, method 800 may be performed by a representative server computer including one or more processors, memory, mass storage, network and other interface circuitry and so forth.

As illustrated in FIG. 8, method 800 begins by receiving an application for execution in the cloud computing system (block 810). As an example, a tenant of a datacenter may upload an application that may be instantiated on multiple different computing systems of the datacenter to provide scalability for execution of different workloads of the application. Next at block 820 the application is stored in a storage of the cloud computing system. As an example, this storage may be a network-attached storage. Thereafter at block 830 the application is executed.

During execution of the application, statistical information of memory access instructions may be maintained (block 840). More specifically as described herein, this statistical information may include at least cache access history information relating to hit/miss information, e.g., in the form of count information, metadata associated with the memory access instructions and so forth.

Still with reference to FIG. 8, at block 850 at least one memory access instruction may be automatically converted to a subline memory access instruction based on the statistical information. For example, as described herein, a given cached load instruction may be converted to an uncached load instruction, when it is determined that few or no cache hits for the instruction have occurred during execution. Still with reference to FIG. 8, continued execution of the application in the cloud computing system occurs (block 860).

Figure 9A:
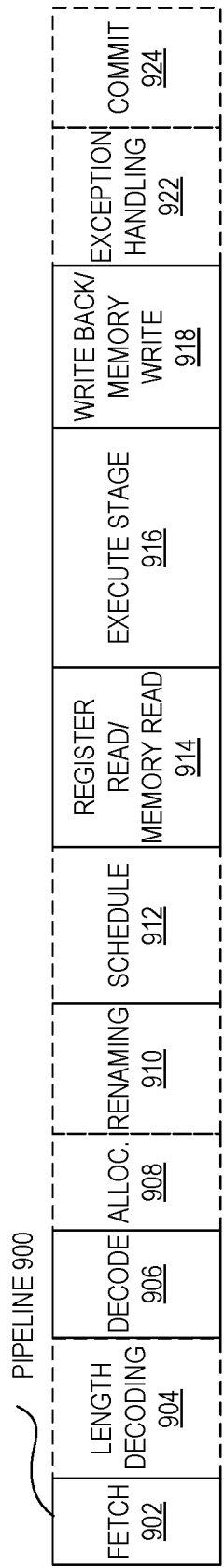
FIG. 9A is a block diagram illustrating both an exemplary in-order pipeline and an exemplary register renaming, out-of-order issue/execution pipeline according to embodiments of the invention.
Figure 9B:
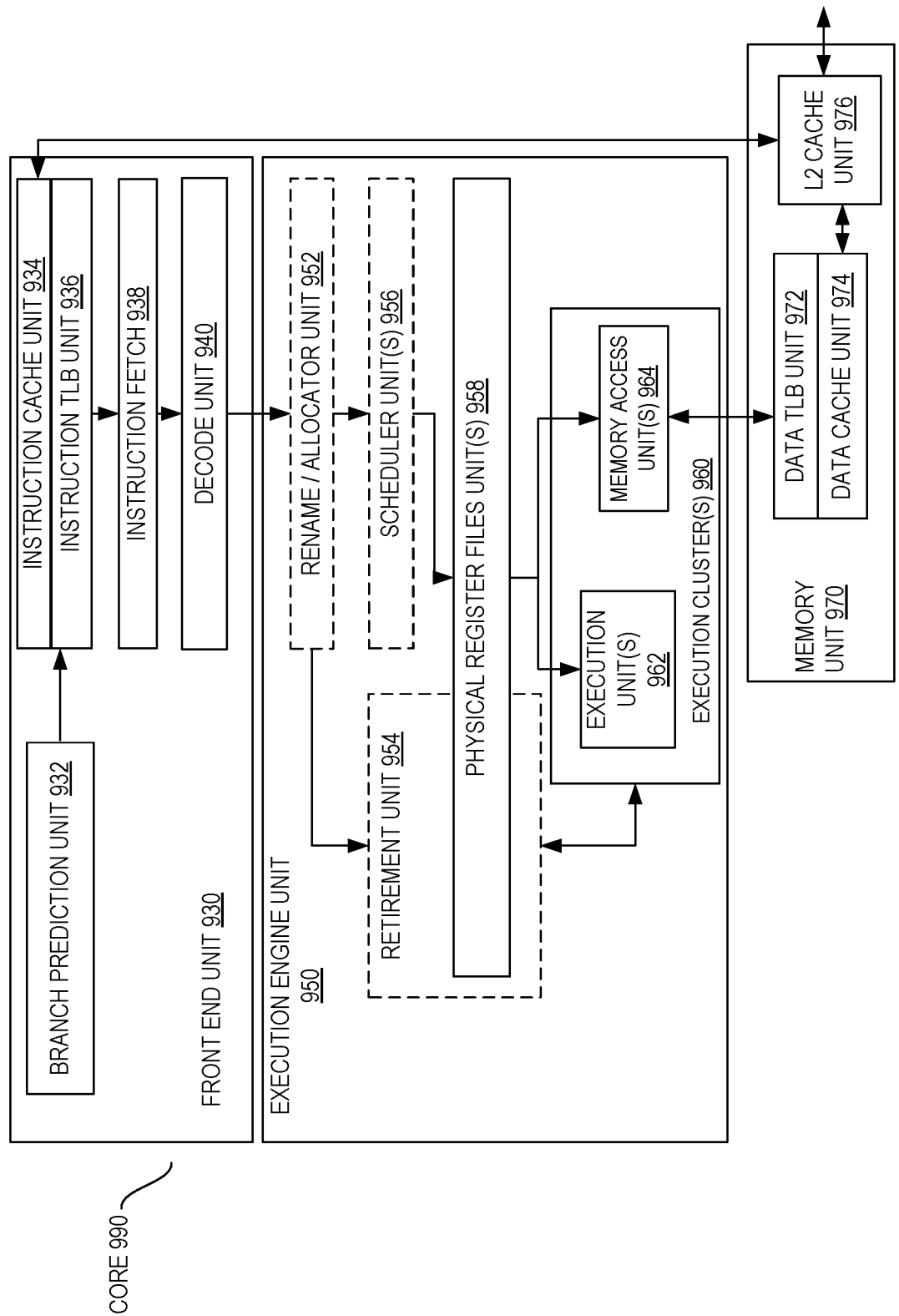
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A and 9B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924. It is at commit stage 924 that embodiments may determine whether a memory access instruction expressed subline access behavior (e.g., based on cache hierarchy access history and as such, it is at commit stage 924 that appropriate updates to one or more of a SIT or SAT may occur as described herein).

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. Memory access units 964 may include the various circuitry described herein, including subline conversion circuitry, subline control circuitry and SIT and SATs, such as described above with regard to FIG. 1.

The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. In addition, memory access units 964 may, based on maintained information associated with memory access instructions, determine when it is appropriate to convert a given memory access instruction into a subline memory access instruction, as described herein. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10B:
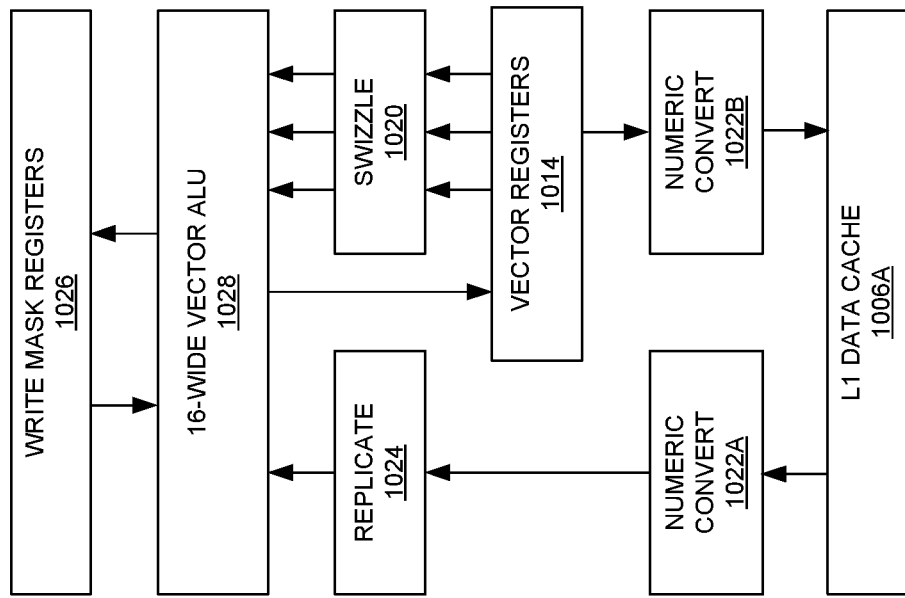
FIGS. 10A and 10B illustrate a block diagram of a more specific exemplary in-order core architecture, which core would be one of several logic blocks (including other cores of the same type and/or different types) in a chip.
Figure 10A:
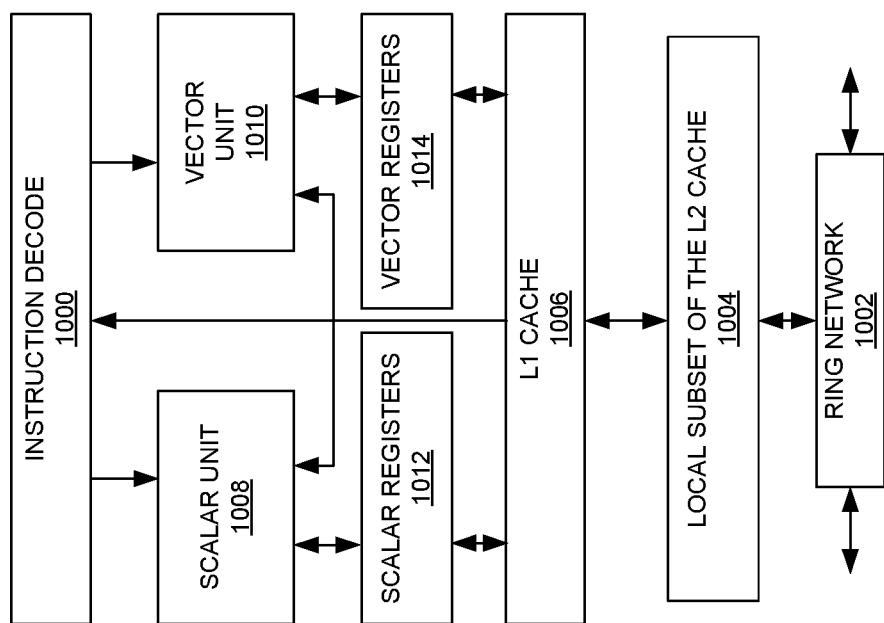

FIGS. 10A and 10B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1314. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
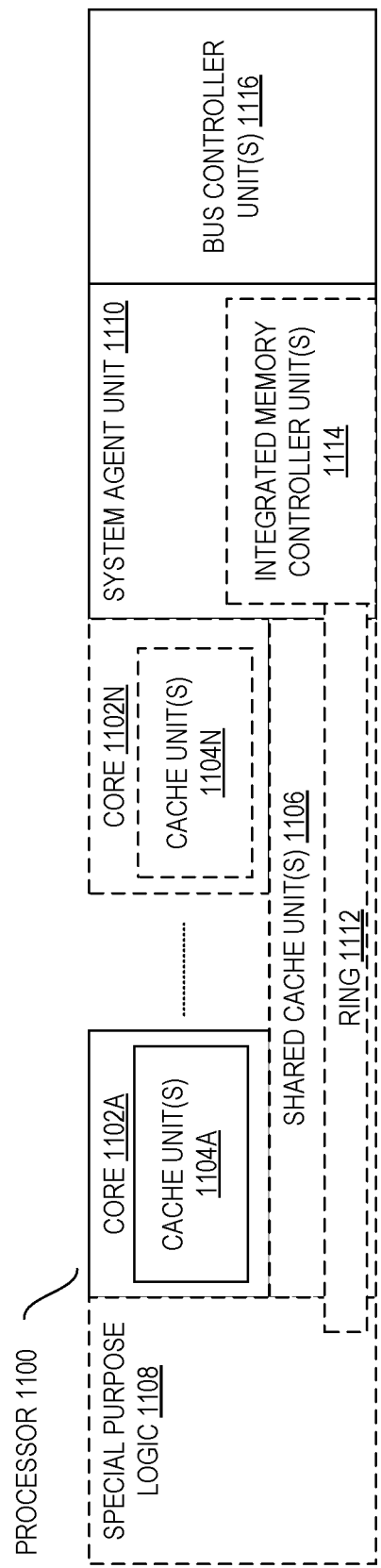
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
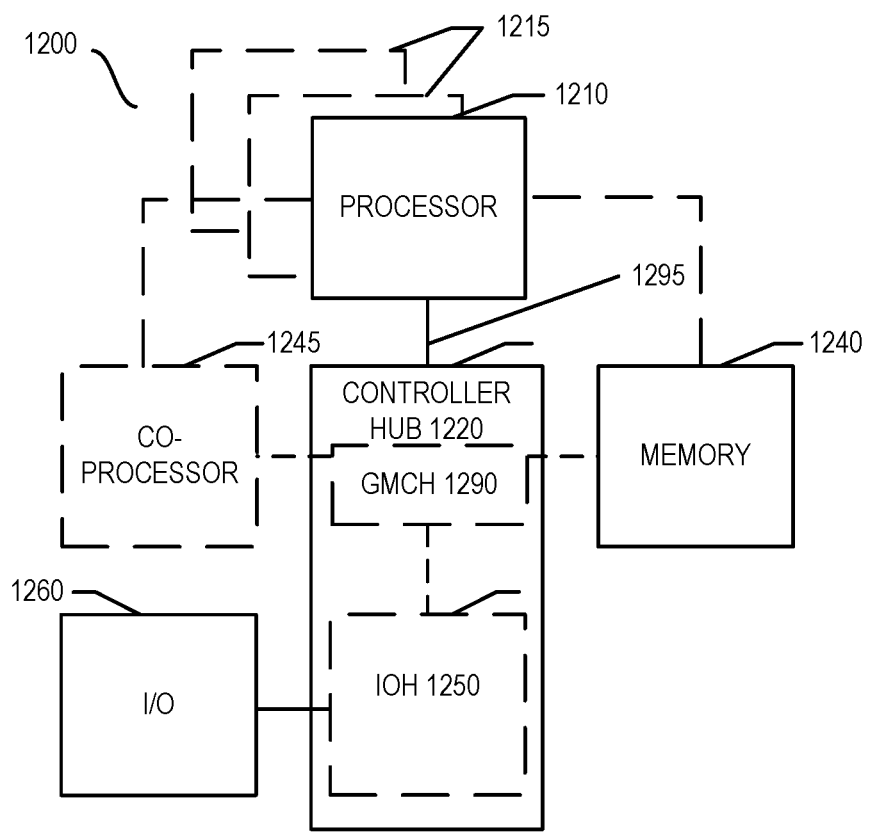
FIG. 12 is a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
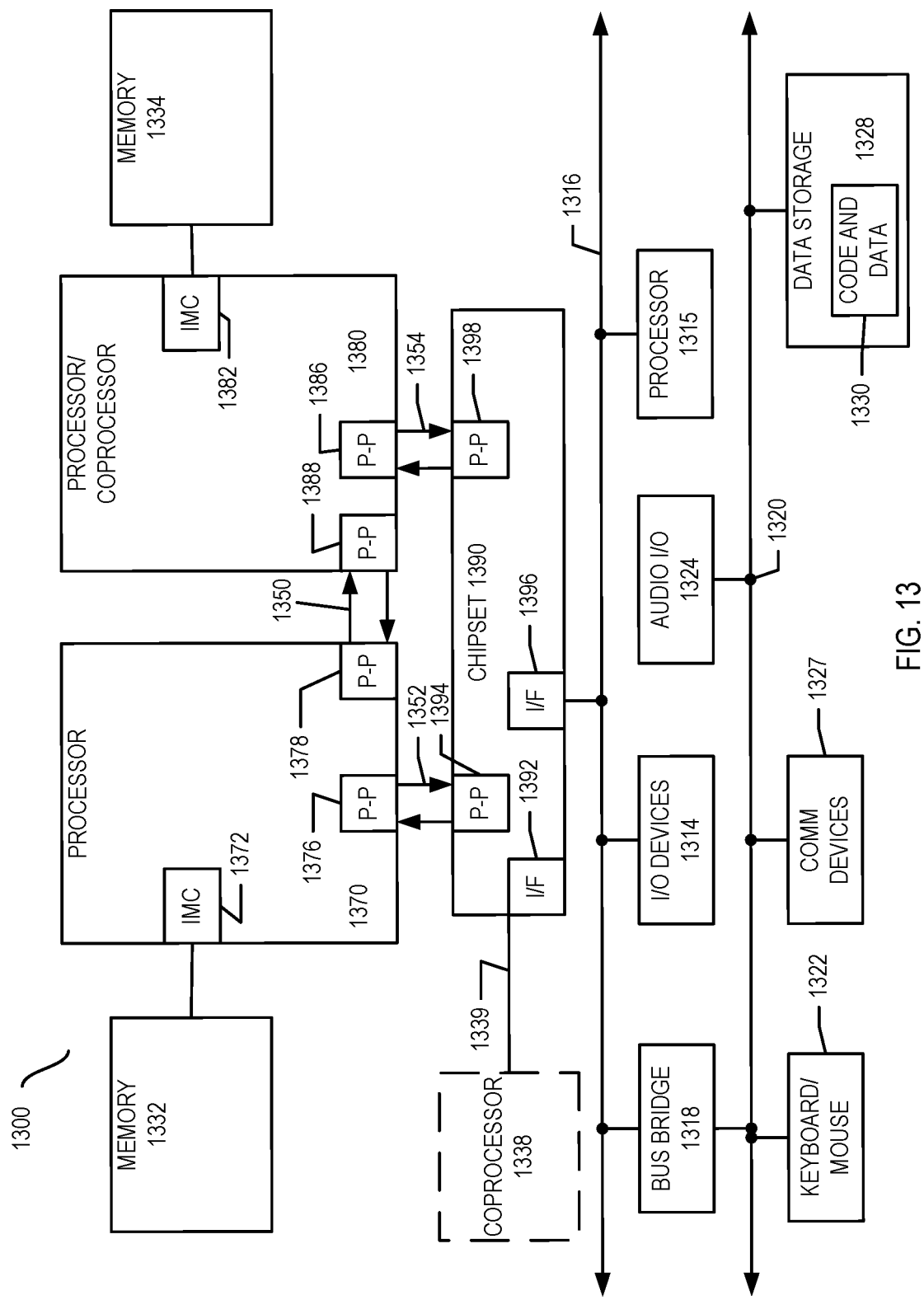
FIG. 13 is a block diagram of a first more specific exemplary system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
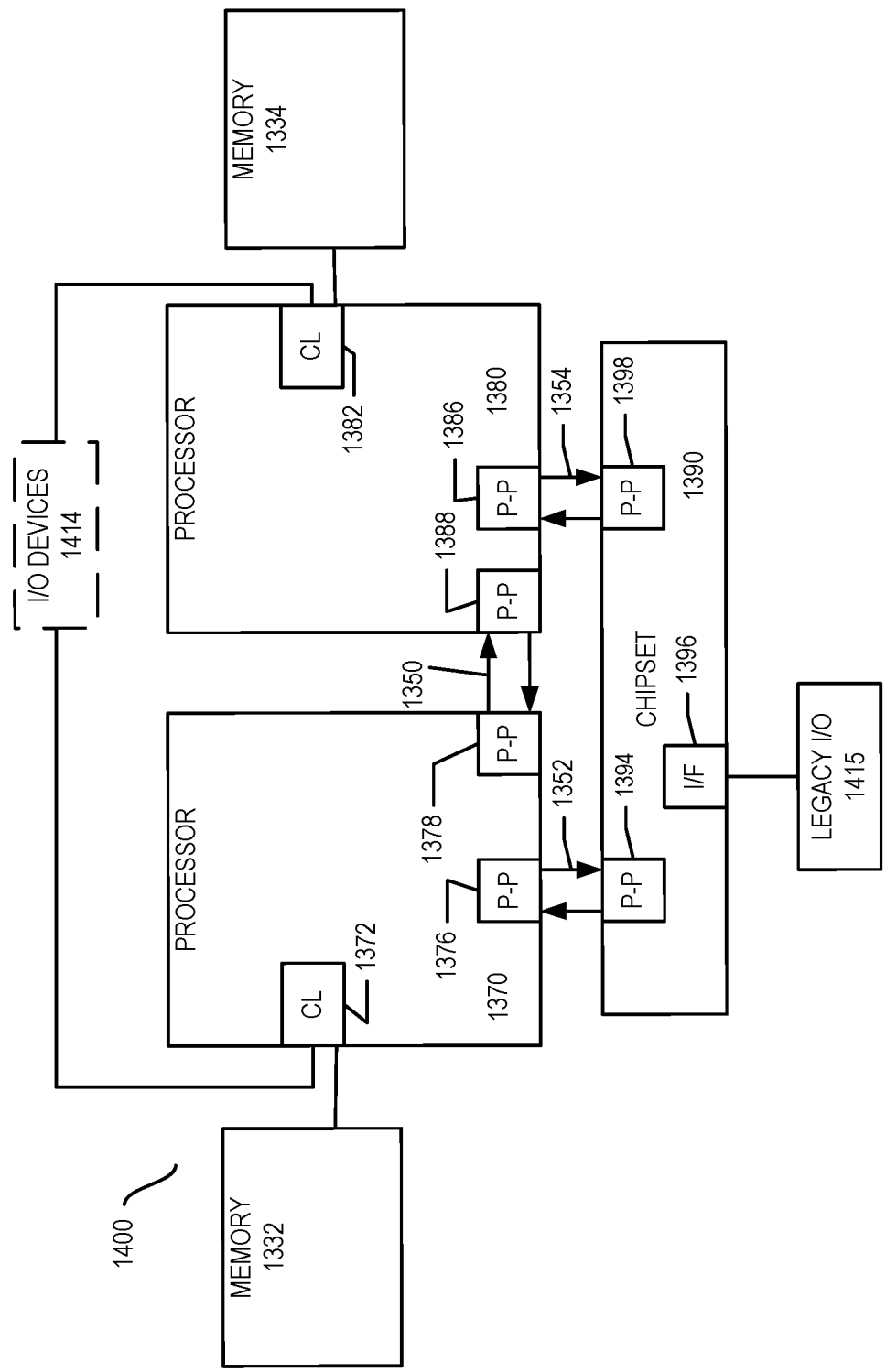
FIG. 14 is a block diagram of a second more specific exemplary system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
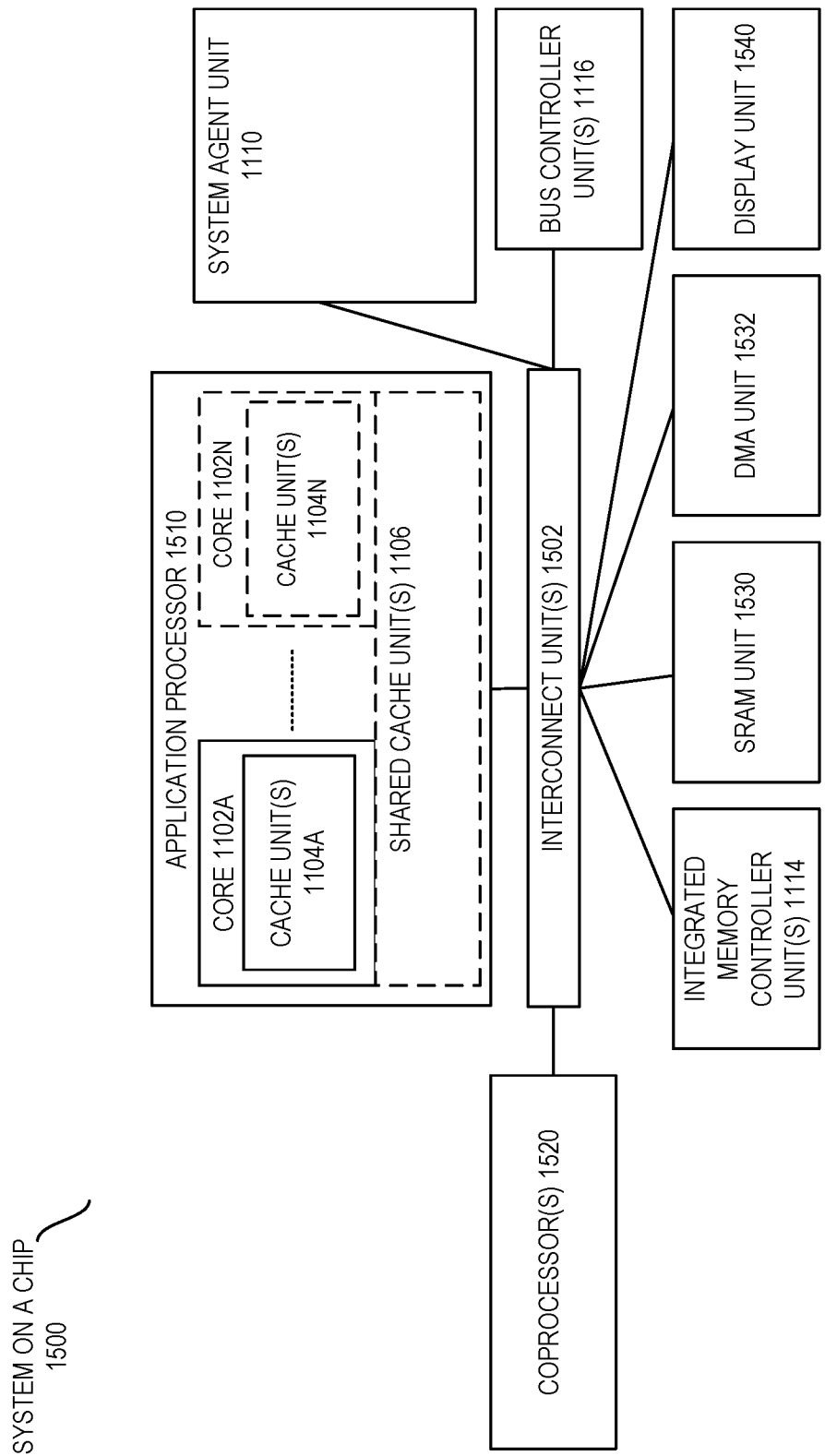
FIG. 15 is a block diagram of a SoC in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
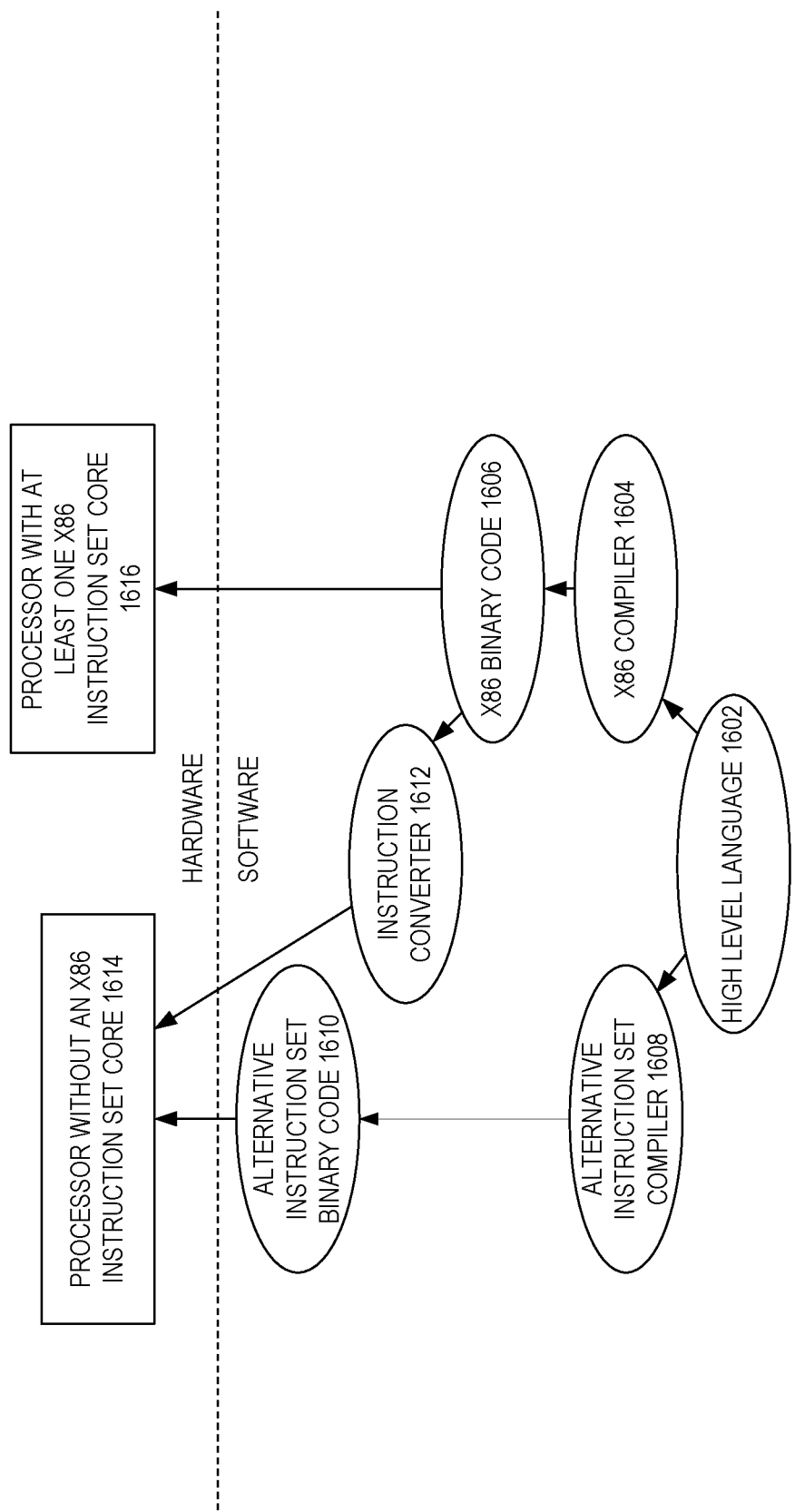
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

The following examples pertain to further embodiments.

In one example, an apparatus comprises a memory access circuit to receive memory access instructions including a first memory access instruction and provide at least some of the memory access instructions to a memory subsystem for execution. The memory access circuit may have a conversion circuit to convert, based at least in part on an access history for the first memory access instruction, the first memory access instruction to a first subline memory access instruction and provide the first subline memory access instruction to the memory subsystem. The apparatus may further include the memory subsystem coupled to the memory access circuit to execute the at least some of the memory access instructions and the first subline memory access instruction.

In an example, the apparatus further comprises a subline detection circuit to maintain access history information for the memory access instructions.

In an example, the apparatus further comprises a subline instruction table including a plurality of entries each to store an address of a memory access instruction and count information for the memory access instruction.

In an example, the conversion circuit is to convert the first memory access instruction when the count information in a first entry of the subline instruction table for the first memory access instruction exceeds a first threshold.

In an example, the apparatus further comprises a subline address table including a plurality of entries each to store a data address of a memory access instruction and an index for the memory access instruction in the subline instruction table.

In an example, the subline detection circuit is to allocate an entry into the subline address table for the first memory access instruction when the count information in the first entry of the subline instruction table for the first memory access instruction exceeds a second threshold, the second threshold less than the first threshold.

In an example, the subline detection circuit is to update in a second direction the count information in the first entry of the subline instruction table in response to commitment of a second memory access instruction having a data address that matches an entry in the subline address table for the first memory access instruction.

In an example, the apparatus is to prevent a conversion of a second memory access instruction to a second subline memory access instruction in response to the count information in a second entry of the subline instruction table for the second memory access instruction being less than the first threshold.

In an example, the subline detection circuit is to allocate the first entry of the subline instruction table for the first memory access instruction in response to a miss for the first memory access instruction in a cache hierarchy.

In an example, the subline detection circuit is to update in a first direction the count information in the first entry of the subline instruction table in response to another miss for the first memory access instruction in the cache hierarchy.

In an example, the subline detection circuit is to update in a second direction the count information in the first entry of the subline instruction table in response to a hit for the first memory access instruction in the cache hierarchy.

In an example, the conversion circuit is to convert the first memory access instruction comprising a cached memory access instruction for a cacheline width to the first subline memory access instruction comprising an uncached memory access instruction for less than the cacheline width.

In another example, a method comprising: receiving, in a memory access circuit of a processor, a first memory access instruction; determining whether an instruction pointer of the first memory access instruction matches an instruction pointer stored in an entry of a first table of the processor; in response to determining that the instruction pointer matches the instruction pointer stored in the entry of the first table, accessing count information stored in the entry of the first table; determining whether the count information exceeds a first threshold; in response to determining that the count information exceeds the first threshold, converting the first memory access instruction to a first subline memory access instruction; and sending the first subline memory access instruction to a memory subsystem of the processor for execution.

In an example, the method further comprises, in response to determining that the instruction pointer matches the instruction pointer stored in the entry of the first table, updating metadata of the entry of the first table.

In an example, the method further comprises, in response to determining that the count information does not exceed the first threshold, not converting the first memory access instruction to the first subline memory access instruction and sending the first memory access instruction to the memory subsystem.

In an example, the method further comprises at commitment of a second memory access instruction, updating in a first direction count information in a second entry of the first table in response to a miss for the second memory access instruction in a cache hierarchy of the processor.

In an example, the method further comprises: in response to the miss, determining whether the count information in the second entry exceeds a second threshold, the second threshold less than the first threshold; and in response to determining that the count information in the second entry exceeds the second threshold, writing an entry into a second table, the entry to store a data address of the second memory access instruction and an index of the second memory access instruction in the first table.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor including at least one core to execute instructions, the at least one core having a memory access circuit to automatically convert a first memory access instruction to a first subline memory access instruction in response to count information associated with a cache miss history of the first memory access instruction in a cache hierarchy of the processor that exceeds a first threshold, and a memory subsystem to send the first subline memory access instruction to a memory coupled to the processor. The system further includes the memory coupled to the processor, where the memory is to obtain and send a data block to the processor in response to the first subline memory access instruction, the data block having a width less than a cacheline.

In an example, the memory access circuit is to automatically convert the first memory access instruction comprising a cached memory access instruction for a cacheline width to the first subline memory access instruction comprising an uncached memory access instruction for the width less than the cacheline.

In an example, the system comprises a cloud computing system to execute an application of a tenant, the application to operate on a data set having at least one of non-spatial locality and non-temporal locality, the application comprising the first memory access instruction.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE- PROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a memory access circuit to receive memory access instructions including a first memory access instruction and provide at least some of the memory access instructions to a memory subsystem for execution, the memory access circuit having a conversion circuit to convert, based at least in part on an access history for the first memory access instruction, the first memory access instruction to a first subline memory access instruction and provide the first subline memory access instruction to the memory subsystem;
the memory subsystem coupled to the memory access circuit to execute the at least some of the memory access instructions and the first subline memory access instruction;
a subline detection circuit to maintain access history information for the memory access instructions; and
a subline instruction table including a plurality of entries each to store an address of a memory access instruction and count information for the memory access instruction,
wherein the conversion circuit is to convert the first memory access instruction when the count information in a first entry of the subline instruction table for the first memory access instruction exceeds a first threshold.

2. The apparatus of claim 1, further comprising a subline address table including a plurality of entries each to store a data address of a memory access instruction and an index for the memory access instruction in the subline instruction table.

3. The apparatus of claim 2, wherein the subline detection circuit is to allocate an entry into the subline address table for the first memory access instruction when the count information in the first entry of the subline instruction table for the first memory access instruction exceeds a second threshold, the second threshold less than the first threshold.

4. The apparatus of claim 2, wherein the subline detection circuit is to update in a second direction the count information in the first entry of the subline instruction table in response to commitment of a second memory access instruction having a data address that matches an entry in the subline address table for the first memory access instruction.

5. The apparatus of claim 1, wherein the apparatus is to prevent a conversion of a second memory access instruction to a second subline memory access instruction in response to the count information in a second entry of the subline instruction table for the second memory access instruction being less than the first threshold.

6. The apparatus of claim 1, wherein the subline detection circuit is to allocate the first entry of the subline instruction table for the first memory access instruction in response to a miss for the first memory access instruction in a cache hierarchy.

7. The apparatus of claim 6, wherein the subline detection circuit is to update in a first direction the count information in the first entry of the subline instruction table in response to another miss for the first memory access instruction in the cache hierarchy.

8. The apparatus of claim 7, wherein the subline detection circuit is to update in a second direction the count information in the first entry of the subline instruction table in response to a hit for the first memory access instruction in the cache hierarchy.

9. The apparatus of claim 1, wherein the conversion circuit is to convert the first memory access instruction comprising a cached memory access instruction for a cacheline width to the first subline memory access instruction comprising an uncached memory access instruction for less than the cacheline width.

10. A system comprising:
a processor including at least one core to execute instructions, the at least one core comprising:
a memory access circuit to automatically convert a first memory access instruction to a first subline memory access instruction in response to count information associated with a cache miss history of the first memory access instruction in a cache hierarchy of the processor that exceeds a first threshold,
a memory subsystem to send the first subline memory access instruction to a memory coupled to the processor,
a subline detection circuit to maintain access history information for the memory access instructions, and
a subline instruction table including a plurality of entries each to store an address of a memory access instruction and count information for the memory access instruction,
wherein the memory access circuit is to convert the first memory access instruction when the count information in a first entry of the subline instruction table for the first memory access instruction exceeds a first threshold; and
the memory coupled to the processor, wherein the memory is to obtain and send a data block to the processor in response to the first subline memory access instruction, the data block having a width less than a cacheline.

11. The system of claim 10, wherein the memory access circuit is to automatically convert the first memory access instruction comprising a cached memory access instruction for a cacheline width to the first subline memory access instruction comprising an uncached memory access instruction for the width less than the cacheline.

12. The system of claim 10, wherein the system comprises a cloud computing system to execute an application of a tenant, the application to operate on a data set having at least one of non-spatial locality and non-temporal locality, the application comprising the first memory access instruction.

13. A machine-readable medium having stored thereon instructions, which if performed by a machine cause the machine to perform a method comprising:
receiving, in a memory access circuit of a processor, a first memory access instruction;
determining whether an instruction pointer of the first memory access instruction matches an instruction pointer stored in an entry of a first table of the processor;
in response to determining that the instruction pointer matches the instruction pointer stored in the entry of the first table, accessing count information stored in the entry of the first table;

determining whether the count information exceeds a first threshold;

in response to determining that the count information exceeds the first threshold:
converting the first memory access instruction to a first subline memory access instruction; and
sending the first subline memory access instruction to a memory subsystem of the processor for execution; and in response to determining that the count information does not exceed the first threshold:
not converting the first memory access instruction to the first subline memory access instruction; and
sending the first memory access instruction to the memory subsystem.

14. The machine-readable medium of claim 13, wherein the method further comprises, in response to determining that the instruction pointer matches the instruction pointer stored in the entry of the first table, updating metadata of the entry of the first table.

15. The machine-readable medium of claim 13, wherein the method further comprises at commitment of a second memory access instruction, updating in a first direction count information in a second entry of the first table in response to a miss for the second memory access instruction in a cache hierarchy of the processor.

16. The machine-readable medium of claim 15, wherein the method further comprises:
in response to the miss, determining whether the count information in the second entry exceeds a second threshold, the second threshold less than the first threshold; and
in response to determining that the count information in the second entry exceeds the second threshold, writing an entry into a second table, the entry to store a data address of the second memory access instruction and an index of the second memory access instruction in the first table.

* * * * *